June 20, 1961 A. TURAK 2,989,242
DISPENSING VALVE WITH DIFFUSER
Filed Feb. 8, 1960 2 Sheets-Sheet 1
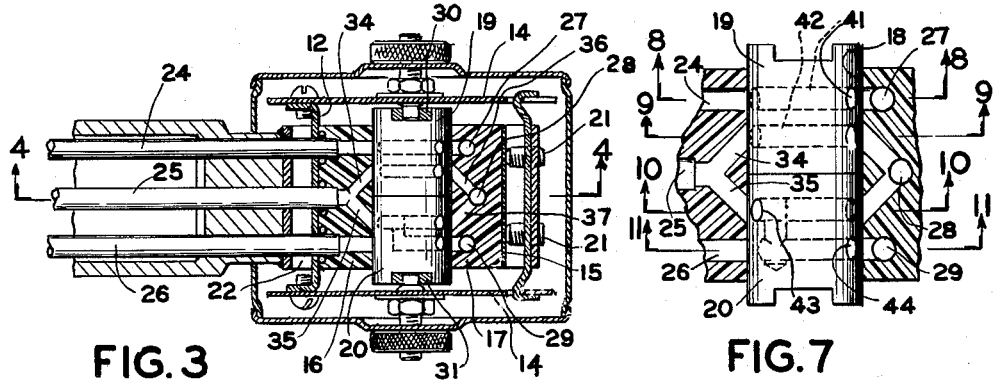
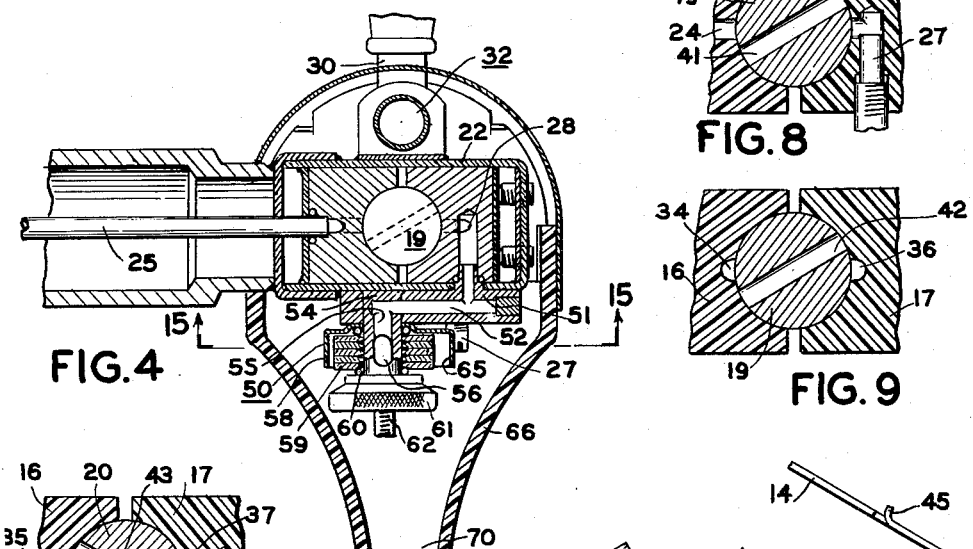
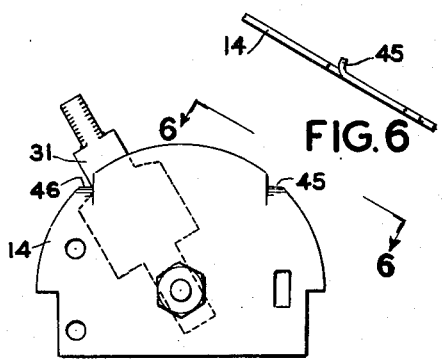
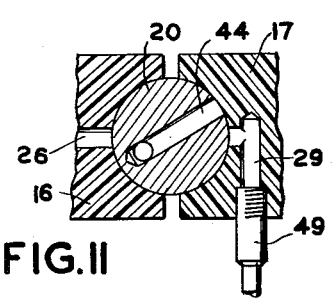
INVENTOR.
ANTHONY TURAK
BY Woodling and Krost,
ATTORNEYS

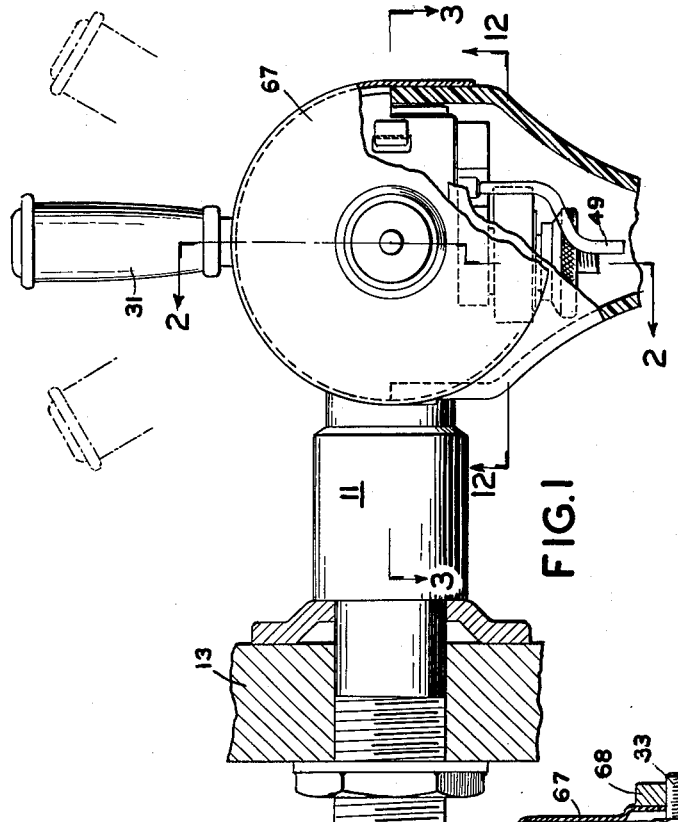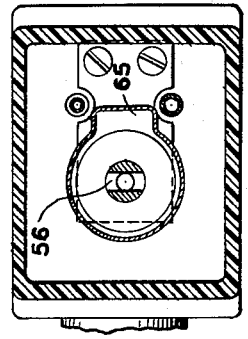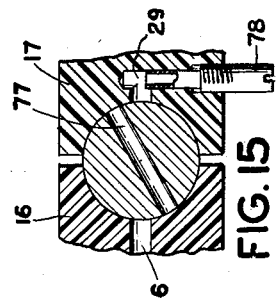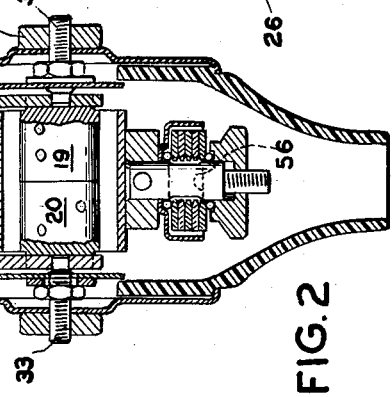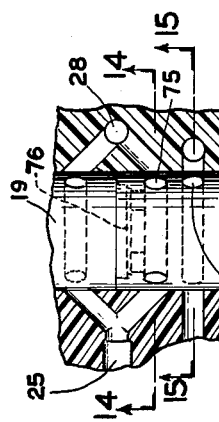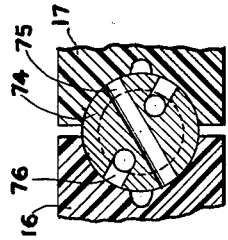

United States Patent Office 2,989,242
Patented June 20, 1961

2,989,242
DISPENSING VALVE WITH DIFFUSER
Anthony Turak, 11208 Lorain Ave., Cleveland, Ohio
Filed Feb. 8, 1960, Ser. No. 7,401
10 Claims. (Cl. 239—113)

The invention relates in general to dispensing valves and more particularly to plural dispensing valves to intermix two or more liquids, especially with one of these liquids being a carbonated liquid.

The mixing and dispensing art has known various types of valves for dispensing liquids, including beverages. Some valves are for premixed types of liquids and other valves are for postmixed types of liquids. The present invention relates more particularly to postmix valves which may be used to mix a carbonated water or soda water with various flavoring syrups or extracts just adjacent the discharge opening of the valve in a postmix condition to establish various flavored and carbonated beverages.

The valves of the prior art have had various forms of dispensing devices and diffusers to break up the soda water in a postmix type of valve so that this soda water would readily mix with the flavoring extract. Most of these diffusers tended to break up the soda water too much so that much of the carbon dioxide in the soda water was lost before the beverage was dispensed into the glass or other container. Under such conditions the drink or beverage tasted flat in contradistinction to one which had a considerable amount of carbon dioxide retained or entrapped in the liquid. The more carbon dioxide entrapped or dissolved in the liquid at the time it is drunk, the more "bite" the beverage has. This dissolved carbon dioxide thus gives a desirable taste sensation in the beverage. Most of the prior art diffusers in dispensing valves, especially postmix valves, were ones which permitted too much of the carbon dioxide to bubble out of the liquid before it was dispensed into the glass, and accordingly, the drink tasted flat.

Accordingly, an object of the present invention is to provide a dispensing valve which maintains a high percentage of dissolved carbon dioxide in the liquid being dispensed.

Still another object of the invention is to provide a diffuser for a dispensing valve which retains or redissolves carbon dioxide into the carbonated beverage as it is being dispensed.

Still another object of the invention is to provide a dispensing valve having a diffuser with a large area and a very small transverse dimension through which the carbonated liquid passes so as to establish a relatively low rate of flow per unit area while retaining a total average rate of flow which is satisfactory.

Still another object of the invention is to provide a dispensing valve with a diffuser which has plural passageways for the flow of carbonated water which passageways are very small in transverse dimension to retain or redissolve carbon dioxide in the liquid.

Another object of the invention is to provide a postmix dispensing valve with a diffuser having a director to direct a flow of soda water to the inside of a spout to wash it clean of any syrup or extract.

Other objects and a fuller understanding of this invention may be had by referring to the following description and claims, taken in conjunction with the accompanying drawings, in which:

FIGURE 1 is a longitudinal side view partially in section of a dispensing valve embodying the invention;
FIGURE 2 is a sectional view on line 2—2 of FIGURE 1;
FIGURE 3 is a sectional view on line 3—3 of FIGURE 1;
FIGURE 4 is a longitudinal vertical sectional view of the valve;
FIGURE 5 is a view of a side plate of the valve;
FIGURE 6 is a view taken on line 6—6 of FIGURE 5;
FIGURE 7 is an enlarged partial sectional view similar to FIGURE 3;
FIGURES 8, 9, 10 and 11 are sectional views taken on the respectively numbered lines of FIGURE 7;
FIGURE 12 is a sectional view on line 12—12 of FIGURE 1;
FIGURE 13 is an enlarged partial sectional view similar to FIGURE 7, but showing a modification of the valve; and
FIGURES 14 and 15 are sectional views taken on the correspondingly numbered lines of FIGURE 13.

The FIGURES 1–12 of the drawing show a dispensing valve 11 having a base 12 which may be fixed to a support 13 in any suitable manner. A yoke 22 is fixedly attached to the base 12. Side plates 14 are attached to the base 12 and carry a front plate 15.

First and second body portions 16 and 17 are mounted within the yoke 22 and together define a cylindrical valve chamber 18. First and second axially aligned abutting cylindrical valve plugs 19 and 20 are contained within the valve chamber 18. Screws 21 and the yoke 22 compress the body portions 16 and 17 onto the valve plugs 19 and 20 for a fluid-tight connection.

First, second and third entrance conduits 24, 25 and 26, respectively, enter through the base 12 and are adapted to be connected to sources of liquid. These entrance conduits lead to the valve chamber 18 through the first body portion 16. First, second and third exit conduits 27, 28 and 29 are provided in the second body portion and lead from the valve chamber 18.

The valve plugs 19 and 20 have slots on the outer faces thereof to receive first and second handles 30 and 31, respectively, so that these valve plugs may be moved to first and second positions on either side of a neutral position, as best shown in FIGURE 1. A detent mechanism 32 releasably maintains the handles in the neutral position shown in full lines in FIGURE 1. Screws 33 are threaded into the side plates 14 and pass through apertures in the handles 30 and 31 to bear against the valve plugs 19 and 20. This establishes that the inner faces of the valve plugs are in tight engagement. The inner faces of these valve plugs 19 and 20 are along a longitudinal central plane and the second entrance conduit 25 and second exit conduit 28 are also on this longitudinal central plane. The second entrance conduit 25 splits in the first body portion 16 into passageways 34 and 35. Similarly, the second exit conduit 28 in the second body portion 17 splits into passageways 36 and 37.

The valve plugs 19 and 20 are provided with a plurality of transverse bore means at different angular positions and arranged for selective registration with the conduits in the first and second positions of each valve plug. These transverse bore means include first, second, third and fourth transverse bores 41–44 inclusive. The first transverse bore 41 is in the first valve plug 19 and registers with the first entrance and exit conduits 24 and 27 with this first valve plug in the first position. This first position is with the valve plug 19 turned approximately 30° clockwise from the position shown in FIGURE 8. This means that the handle 30 has been moved toward the front of the valve until it hits a stop 45 on the side plate 14. The second transverse bore 42 is in the first valve plug 19 and registers with the second entrance and exit conduit 25 and 28, respectively, with this first valve plug 19 in the first position. Thus, the first position of the first valve plug 19 provides intermixed discharge of fluids from the first and second exit conduits 27 and 28.

The third transverse bore 43 is in the second valve plug 20 and registers with the second entrance and exit conduits 25 and 28 with this second valve plug 20 in a second position. This second position of the second valve plug 20 is with the corresponding handle 31 moved to the rear of the valve so that this second valve plug 20, as viewed in FIGURE 10, has been rotated approximately 30° counterclockwise. This second position of the handle 31 is with the handle abutting a stop 46 on the side plate 14. The fourth transverse bore 44 is in the second valve plug 20 and may be termed a by-pass bore since it registers with the second entrance conduit 25 and the third exit conduit 29 with this second valve plug 20 in a first position.

A jet tube 49 is connected to the third exit conduit 29. A diffuser 50 is provided in the valve 11 and is mounted on the yoke 22. This diffuser 50 includes a block 51 having a passageway 52 which is an entrance means of the diffuser 50 and which is connected to receive fluid from the second exit conduit 28. A central shaft 54 is mounted in the block 51 and has a vertical inlet conduit 55 therein. A transverse aperture 56 is provided in the lower closed end of the central shaft 54 and extends through this shaft in communication with the vertical conduit 55. An antisplash housing 58 has generally an inverted cup shape and is mounted on the central shaft 54. A plurality of flat diffuser washers 59 form a stack of washers which is slidably received on the central shaft 54 at the transverse aperture 56. O-ring seals 60 are provided at the top and bottom of the stack of washers 59 to relatively seal the stack and the central shaft 54. A nut 61 is threaded on a screw 62 forming an extension of the lower end of the shaft 54. This nut 61 may be knurled the better to be gripped, and this nut compresses together the stack of washers 59 to a variable degree to limit liquid flow between the washers. The inner edges of the washers 59 are the leading edges or the edges facing the flow of liquid and these edges are chamfered. This chamfering helps to divide equally the flow of liquid between the adjacent faces of all the washers.

The antisplash housing 58 covers the top of the stack of washers 59 and extends downwardly around the periphery of the stack, but is slightly spaced from this outer periphery.

The antisplash housing 58 includes a director section 65 which is oriented toward the front of the valve and this director section is spaced from the outer periphery a greater distance than the remainder of the antisplash housing 58. The director section 65 directs liquid toward the front of the valve, and hence, toward the first and third exit conduits 27 and 29.

The entire valve 11 includes a spout 66 carried on the valve by end covers 67, in turn held on by nuts 68 threaded on the screws 33. A top cover 69 cooperates with the end covers to form a shroud for the entire valve 11. The spout 66 has a discharge opening 70 at the lower end thereof through which all liquids are dispensed. The diffuser 50 is mounted inside the spout 66 and is mounted rearwardly of the first and third exit conduits 27 and 29.

The complete dispensing valve 11 is adapted to dispense one or a plurality of postmixed liquids. The second entrance conduit 25 may be connected to a source of carbonated liquids, such as soda water, and the first entrance conduit 24 and also the second entrance conduit 26 may be connected to sources of flavoring extract of syrup. When such syrup and the soda water are postmixed in the spout 66, this provides a flavored and carbonated beverage.

With the first handle 30 moved forwardly to the first position, the transverse bores 41 and 42 are then positioned horizontally and this causes liquid to flow from the first entrance conduit 24 to the first exit conduit 27 which discharges liquid directly to the inside of the spout 66 and by-passes the diffuser 50. The second transverse bore 42 provides registration between the second entrance and exit conduits 25 and 28 and this provides soda water flow into the diffuser 50. It flows into the entrance means or passageway 52 and through the transverse aperture 56 to the leading edge of all the diffuser washers 59. These washers may be considered a stack of plates which provide a large area for flow of the soda water, but provide a very limited transverse dimension for this flow. Normally the nut 61 is tightened up by hand to be fairly tight and this compresses the O-ring seals at the top and bottom of this stack of washers 59. Accordingly, when the soda water under pressure is presented to the leading edges of these washers 59, the chamfering on these leading edges helps to establish that the liquid flow is divided equally between all the adjacent faces of the washers 59. This substantially equal flow forces apart all the washers as much as they may be forced apart as determined by the tightness of the nut 61. It is found that this transverse dimension between the adjacent faces of the washers is only a few thousandths of an inch. Actually more washers are used than are illustrated in the drawing and the washers are thinner, it having been found that the greater number of washers the better the quality of the soda water.

The degree of tightness of the nut 61 regulates not only the total flow of the soda water, but also regulates the amount of carbon dioxide retained in the soda water as it is dispensed into a glass from the discharge opening 70. The tighter the nut, the smaller are the spaces between the washers, and the better the quality of soda water by retaining more carbon dioxide in the water. The same quality of soda can be obtained with only two washers, but the flow is correspondingly less. When the soda water is first dispensed, there may be some spurting of soda water directly radially outward at the top of the stack because the washer faces are at that time contiguous or in engagement. The antisplash housing 58 directs this initial flow downwardly which lasts for only a fraction of a second. After this initial flow the washers become equally spaced as aided by the chamfered leading edges and flow takes place between all adjacent faces. During normal flow it has been found that the soda water flows downwardly around the outer periphery of the stack of washers 59 and at that time the antisplash housing 58 would not be needed. The director section 65 provides a greater spacing at the front of the stack so that some soda water is directed more forwardly to wash down the inside of the spout 66, and hence, wash down all syrup or flavoring extract dispensed from the first exit conduit 27. This assures a uniform mixture each time soda water plus a flavoring extract are postmixed and dispensed. Also it assures that the inside of the spout 66 is washed clean by the soda water each time so that if a different liquid is dispensed the next time the valve is used the second beverage will not be contaminated by the first beverage. The top of the nut 61 is beveled outwardly to help this flow of liquid reach the inside surfaces of the spout 66.

With the second handle 31 moved rearwardly the third transverse bore 43 registers with the second entrance and exit conduits 25 and 28 to provide discharge of only soda water directed through the diffuser 50 to the discharge opening 70. This is the familiarly known "soft" soda and the diffuser 50 of the present invention has been found to provide a very high concentration of retained carbon dioxide in the dispensed soda water. The present day dispensing valves dispense about six ounces of soda water in three seconds. Testers to test the concentration of the dispensed soda water are currently in use in which a predetermined volume of the dispensed soda water is placed inside a pressure container which is then closed and vigorously shaken. This pressure container has a thermometer and a pressure gauge. The pressure gauge registers the pressure of the carbon dioxide as it is released from the soda water as a gas. The temperature of the liquid in the pressure container and the pressure therein are correlated on a chart which determines the percentage of the retained carbon dioxide or carbonation. At normal dispensing temperatures of about 38° a 3½% concentration of carbonation is about average; that is, it provides soda water which is not "flat" nor which has excessive "bite." The previously used postmixed soda water dispensing valves were generally unable to provide much better than this 3½% concentration of carbonation. The present invention utilizing eleven diffuser washers 59 can achieve 5½ to 6% concentration of carbonation at this temperature of about 38° and this provides considerably more "bite" to the soda water than was heretofor obtainable.

The diffuser washers 59 are ground and lapped for smoothness so that the adjacent faces are parallel. It is felt that the superior action of this diffuser 50 is caused by the fact that this stack of washers presents a considerable resistance to the flow of soda water and a substantial pressure is built up in the passageway 52. This pressure increase, acting on the chamfered leading edges, forces apart equally all the washers 59 and thus the flow of soda water is spread out over a large area, yet with a very small transverse dimension. Thus, soda water starting out at about 100–125 p.s.i. tends to release the carbonation therein as soon as the valve is opened and the pressure drops. The action of the diffuser 50, however, is considered to be such that if any carbon dioxide tends to escape as a gas before the liquid flows through the diffuser 50 then this very small spacing of only a few thousandths of an inch between adjacent washer faces causes the carbon dioxide to redissolve in the soda water, and thus, as the soda water is dispensed the carbon dioxide is only then beginning to be released from the soda water. In many previous dispensing valves once the valve was opened the pressure was reduced all along the line completely back to the source of the carbonated water. This meant that the carbon dioxide tended to go out of solution with the liquid and form as individual gas bubbles all along the various passageways in the valve from the carbonated water source to the discharge opening of the valve. Thus, long before the soda water was dispensed much of the carbon dioxide had left it in the form of gas bubbles.

The valve 11 also provides for a jet discharge of soda water and this is by moving the handle 31 forwardly. In this position the fourth transverse bore 44 is positioned horizontally and this provides registration between the second entrance conduit 25 and the third exit conduit 29. This fourth transverse bore 44 has a jog or dog leg inside the second valve plug 20 to provide this offset registration. The jet tube 49 connects the third exit conduit 29 directly to the discharge opening 70, as seen in FIGURE 10, and the diffuser 50 is by-passed.

The FIGURES 13, 14 and 15 show a modification of the present invention wherein a third valve plug 74 may replace the valve plug 20, and cooperate with the valve plug 19. This third valve plug 74 has fifth, sixth and seventh transverse bores 75, 76 and 77, respectively. The fifth transverse bore 75 with the third valve plug 74 in the first or forward position provides registration between the second entrance and exit conduits 25 and 28. The sixth transverse bore 76 also provides registration between the second entrance and exit conduits 25 and 28 when this valve plug 74 is in the second or rearward position. The fifth and sixth transverse bores 75 and 76 are separated by the fact that the sixth transverse bore 76 has an offset or dog leg which passes around the straight transverse bore 75. The purpose of this separation is to prevent leakage at the junction of the valve plug 74 and the first and second body portions 16 and 17. Since the diffuser 50 creates a back pressure at the valve chamber 18 this precaution of preventing leakage at the valve chamber is desirable.

The seventh transverse bore 77 provides registration between the third entrance and exit conduits 26 and 29. With the third exit conduit 29 in this case discharging through a syrup discharge tube 78 to the inside of the spout 66, rather than being connected to the jet tube 49.

This use of the third valve plug 74 provides for a mixture of soda water plus a syrup for a postmix inside the spout 66 when the handle 31 is moved forwardly. When the handle 31 is moved rearwardly soda water only is dispensed through the diffuser 50. Thus, the entire valve 11 may readily provide for different fluid discharge conditions by the simple expedient of replacing the valve plug 20 with the valve plug 74 and by replacing the jet tube 49 with the syrup discharge tube 78.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A plural dispensing valve comprising, in combination, valve body means having a valve chamber, valve plug means in said valve chamber, a spout as part of said valve below said body means, a discharge opening in said spout, first and second entrance conduits in said body means leading to said valve chamber, first and second exit conduits in said body means leading from said valve chamber, a diffuser carried in said valve, and having entrance and exit means with said entrance means connected to said second exit conduit, said first exit conduit being positioned inside said spout on one side of said diffuser, said first exit conduit by-passing said diffuser and communicating directly with said discharge opening, a stack of flat diffuser plates in said diffuser between said entrance and exit means, chamfered leading edges on said diffuser plates facing the flow of fluid through said diffuser to aid in establishing equal fluid flow between the adjacent faces of all said plates, a director section in said exit means facing said first exit conduit to direct fluid thereto, screw means acting transversely on said stack of plates to compress together said stack of plates to a variable degree to limit liquid flow between said plates, first bore means in said valve plug means registering with said first entrance and exit conduits with said valve plug means in a first position, second bore means in said valve plug means registering with said second entrance and exit conduits with said valve plug means in a second position to provide discharge of fluid through said diffuser to said discharge opening, and said director section directing fluid from said diffuser toward said first exit conduit inside said spout to wash clean the inside of said spout.

2. A plural dispensing valve comprising, in combination, first and second body portions defining a valve chamber, first and second valve plugs contained within said valve chamber, a spout as part of said valve below said body portions, a discharge opening in said spout, first and second entrance conduits in said first body portion leading to said valve chamber, first and second exit conduits in said second body portion leading from said valve chamber and passing to said discharge opening, a diffuser carried inside said spout, said first exit conduit being positioned inside said spout on one side of said diffuser, said first exit conduit by-passing said diffuser and communicating directly with said discharge opening, said diffuser having a central shaft with a vertical inlet conduit therein connected to receive fluid from said second exit conduit, said vertical inlet conduit terminating in a transverse aperture at the lower end thereof, a stack of flat diffuser washers slidably received on said central shaft at said transverse aperture, chamfered edges on the inner periphery of said washers, an antisplash housing surrounding but spaced from the periphery of said washers, a director section in said antisplash housing facing said first exit conduit and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree of limit liquid flow between said washers, a first transverse bore in said first valve plug registering with said first entrance and exit conduits with said first valve plug in a first position, a second transverse bore in said second valve plug registering with said second entrance and exit conduits with said second valve plug in a first position to provide discharge of a single fluid through said diffuser to said discharge opening, and said director section directing fluid from said diffuser toward said first exit conduit inside said spout to wash clean the inside of said spout.

3. A plural dispensing valve comprising, in combination, a base, a yoke connected to said base, first and second body portions within said yoke, surface means in said body portions defining a valve chamber, first and second axially aligned abutting cylindrical valve plugs contained within said valve chamber, a spout as part of said valve below said body portions, a discharge opening in said spout, first and second entrance conduits in said first body portion leading to said valve chamber, first and second exit conduits in said second body portion leading from said valve chamber and passing to said discharge opening, a diffuser carried on said yoke, said first exit conduit being positioned inside said spout on one side of said diffuser, said first exit conduit by-passing said diffuser and communicating directly with said discharge opening, said diffuser having a central shaft with a vertical inlet conduit therein connected to receive fluid from said second exit conduit, said vertical inlet conduit terminating in a transverse aperture at the lower end thereof, a stack of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing said first exit conduit and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, a first transverse bore in said first valve plug registering with said first entrance and exit conduits with said first valve plug in a first position, a second transverse bore in said first valve plug registering with said second entrance and exit conduits with said first valve plug in said first position to provide intermixed discharge of fluids from said first and second exit conduits to said discharge opening, a third transverse bore in said second valve plug registering with said second entrance and exit conduits with said second valve plug in a first position to provide discharge of a single fluid through said diffuser to said discharge opening, and said director section directing fluid from said diffuser toward said first exit conduit inside said spout to wash clean the inside of said spout.

4. A plural dispensing valve comprising, in combination, a base, a yoke connected to said base, first and second body portions within said yoke, surface means in said body portions defining a valve chamber, first and second axially aligned abutting cylindrical valve plugs contained within said valve chamber, a spout as part of said valve below said body portions, a discharge opening in said spout, first, second and third entrance conduits in said first body portion leading to said valve chamber, first, second and third exit conduits in said second body portion leading from said valve chamber and passing to said discharge opening, a plurality of bore means at different angular positions in each of said valve plugs and arranged for selective registration with said conduits in first positions of each said valve plug and a second position of said second valve plug, said first positions of each said valve plug being on one side of a neutral position, said second entrance conduit and said second exit conduit being on a central plane of said body portions substantially normal thereto and substantially on the junction line of said first and second valve plugs, a diffuser carried on said yoke, said diffuser having a central shaft with a vertical inlet conduit therein connected to receive fluid from said second exit conduit, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, said first and third exit conduits being positioned toward the front of said valve inside said spout, said director section directing fluid from said diffuser toward the front of said valve and toward said first and third exit conduits inside said spout to wash clean the inside of said spout, said first and third exit conduits by-passing said diffuser and communicating directly with said discharge opening, said bore means including a first transverse bore in said first valve plug in said first position, a second transverse bore in said first valve plug registering with said second entrance and exit conduits with said first valve plug in said first position to provide intermixed discharge of fluids from said first and second exit conduits to said discharge opening, a third transverse bore in said second valve plug registering with said second entrance and exit conduits with said second valve plug in said first position, a fourth transverse bore in said second valve plug registering with said third entrance and exit conduits with said second valve plug in said second position to provide intermixed discharge of fluids from said second and third exit conduits to said discharge opening, and a fifth transverse by-pass bore in said second valve plug separate from said third transverse bore registering with said second entrance and exit conduits with said second valve plug in said second position to provide discharge of a single fluid through said diffuser to said discharge opening.

5. A plural dispensing valve comprising, in combination, a base, a yoke connected to said base, first and second body portions within said yoke, surface means in said body portions defining a valve chamber, first and second axially aligned abutting cylindrical valve plugs contained within said valve chamber, a spout as part of said valve below said body portion, a discharge opening in said spout, first and second entrance conduits in said first body portion leading to said valve chamber, first and second and third exit conduits in said second body portion leading from said valve chamber and passing to said discharge opening, a plurality of bore means at different angular positions in each of said valve plugs and arranged for selective registration with said conduits in first positions of each said valve plug and a second position of said second valve plug, said first positions of each said valve plug being on one side of a neutral position, said second entrance conduit and said second exit conduit being on a central plane of said body portions substantially normal thereto and substantially on the junction line of said first and second valve plugs, a diffuser carried on said yoke, said diffuser having a central shaft with a vertical inlet conduit therein connected to receive fluid from said second exit conduit, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said anti-splash housing, seal means at the top and bottom of said stack of washers relatively sealing said stack of washers and said central shaft, a nut threadably received on the lower end of said central shaft to compress together said stack of washers to a variable degree to limit liquid flow between said washers, said first exit conduit being positioned toward the front of said valve inside said spout, said first exit conduit by-passing said diffuser and communicating directly with said discharge opening, a jet tube connecting said third exit conduit to said discharge opening and by-passing said diffuser, said director section directing fluid from said diffuser toward said first exit conduit inside said spout to wash clean the inside of said spout, said bore means including a first transverse bore in said first valve plug registering with said first entrance and exit conduits with said first valve plug in said first position, a second transverse bore in said first valve plug registering with said second entrance and exit conduits with said first valve plug in said first position to provide intermixed discharge of fluids from said first and second exit conduits to said discharge opening, a third transverse bore in said second valve plug registering with said second entrance and exit conduits with said second valve plug in said first position to provide discharge of a single fluid through said diffuser to said discharge opening, and a fourth transverse by-pass bore in said second valve plug registering with said second entrance and third exit conduits with said second valve plug in said second position to provide jet discharge of a single fluid to said discharge opening.

6. A plural dispensing valve comprising, in combination, a base, a yoke connected to said base, first and second body portions within said yoke, surface means in said body portions defining a valve chamber, first and second axially aligned abutting cylindrical valve plugs contained within said valve chamber, a spout as part of said valve below said body portions, a discharge opening in said spout, first and second entrance conduits in said first body portion leading to said valve chamber, first and second exit conduits in said second body portion leading from said valve chamber and passing to said discharge opening, a plurality of bore means at different angular positions in each of said valve plugs and arranged for selective registration with said conduits in first positions of each said valve plug, said first positions of each said valve plug being on one side of a neutral position, said second entrance conduit and said second exit conduit being on a central plane of said body portions substantially normal thereto and substantially on the junction line of said first and second valve plugs, a diffuser carried on said yoke, said diffuser having a central shaft with a vertical inlet conduit therein connected to receive fluid from said second exit conduit, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, said first exit conduit being positioned toward the front of said valve inside said spout, said first exit conduit by-passing said diffuser and communicating directly with said discharge opening, said bore means including a first transverse bore in said first valve plug registering with said first entrance and exit conduits with said first valve plug in said first position, a second transverse bore in said first valve plug being registering with said second entrance and exit conduits with said first valve plug in said first position to provide intermixed discharge of fluids from said first and second exit conduits to said discharge opening, a third transverse bore in said second valve plug registering with said second entrance and exit conduits with said second valve plug in said first position to provide discharge of a single fluid through said diffuser to said discharge opening, and said director section directing fluid from said diffuser toward said first exit conduit inside said spout to wash clean the inside of said spout.

7. A plural dispensing valve comprising, in combination, body means having a valve chamber, valve plug means contained within said valve chamber, a discharge opening in said valve, first and second entrance conduits in said body means leading to said valve chamber, first and second exit conduits in said body means leading from said valve chamber, a diffuser carried in said valve, said first exit conduit by-passing and communicating directly with said discharge opening, said diffuser having entrance and exit means with said entrance means connected to receive fluid from said second exit conduit, a stack of adjacent diffuser plates in said diffuser between said entrance and exit means, chamfered leading edges on said plates facing the flow of liquid through said diffuser to aid in establishing substantially equal flow between the adjacent faces of all said plates, screw means acting axially on said stack of plates to compress together said stack of plates to a variable degree to limit liquid flow between said plates, a first transverse bore in said valve plug means registering with said first entrance and exit conduits with said valve plug means in a first position, and a second transverse bore in said valve plug means registering with said second entrance and exit conduits with said valve plug means in a second position to provide discharge of fluid through said diffuser to said discharge opening.

8. A plural dispensing valve comprising, in combination, valve body means having a valve chamber, valve plug means contained within said valve chamber, a spout as part of said valve below said body means, a discharge opening in said spout, first and second entrance conduits in said body means leading to said valve chamber, first and second exit conduits in said body means leading from said valve chamber and passing to said discharge opening, a diffuser carried inside said spout, said first exit conduit being positioned inside said spout on one side of said diffuser, said first exit conduit by-passing said diffuser and communicating directly with said discharge opening, said diffuser having a central shaft with a conduit therein connecting with a transverse aperture through the central shaft, a stack of diffuser washers slidably received on said central shaft at said transverse aperture, a housing surrounding but spaced from the periphery of said washers, seal means at the top and bottom of said stack of washers relatively sealing said stack of washers and said central shaft, a nut threadably received on the lower end of said central shaft to compress together said stack of washers to a variable degree to limit liquid flow between said washers, one of said housing and said shaft conduit being connected to said second exit conduit to provide entrance means to said diffuser, a first transverse bore in said valve plug means registering with said first entrance and exit conduits with said valve plug means in a first position, a second transverse bore in said valve plug means registering with said second entrance and exit conduits with said valve plug means in said first position to provide mixed discharge of two fluids through said diffuser to said discharge opening, and the exit from said diffuser directing fluid toward said first exit conduit inside said spout to wash clean the inside of said spout.

9. A plural dispensing valve comprising, in combination, first and second body portions defining a valve chamber, first and second valve plugs contained within said valve chamber, a spout as part of said valve below said body portions, a discharge opening in said spout, first and second entrance conduits in said first body portion leading to said valve chamber, first and second exit conduits in said second body portion leading from said valve chamber and passing to said discharge opening, a diffuser carried inside said spout, said first exit conduit being positioned inside said spout on one side of said diffuser, said first exit conduit by-passing said diffuser and communicating directly with said discharge opening, said diffuser having a central shaft with a vertical conduit therein, said vertical conduit connecting with a transverse aperture through said central shaft, a stack of flat diffuser washers slidably received on said central shaft at said transverse aperture, a housing surrounding but spaced from the periphery of said washers, seal means at the top and bottom of said stack of washers relatively sealing said stack of washers and said central shaft, a nut threadably received on said central shaft to compress together said stack of washers to a variable degree to limit liquid flow between said washers, one of said housing and said vertical conduit being connected to said second exit conduit to provide entrance means to said diffuser, a first transverse bore in said first valve plug registering with said first entrance and exit conduits with said first valve plug in a first position, and a second transverse bore in said second valve plug registering with said second entrance and exit conduits with said second valve plug in a first position to provide discharge of a single fluid through said diffuser to said discharge opening.

10. A plural dispensing valve comprising, in combination, first and second body portions defining a valve chamber, first and second valve plugs contained within said valve chamber, a spout as part of said valve below said body portions, a discharge opening in said spout, first and second entrance conduits in said first body portion leading to said valve chamber, first and second exit conduits in said second body portion leading from said valve chamber and passing to said discharge opening, a diffuser carried inside said spout, said first exit conduit being positioned inside said spout on one side of said diffuser, said first exit conduit by-passing said diffuser and communicating directly with said discharge opening, said diffuser having a central shaft with a vertical inlet conduit therein connected to receive fluid from said second exit conduit, said vertical inlet conduit terminating in a transverse aperture at the lower end thereof, a stack of flat diffuser washers slidably received on said central shaft at said transverse aperture, chamfered edges on the inner periphery of said washers, an antisplash housing surrounding but spaced from the periphery of said washers, a nut threadably received on the lower end of said central shaft to compress together said stack of washers to a variable degree to limit liquid flow between said washers, a first transverse bore in said first valve plug registering with said first entrance and exit conduits with said first valve plug in a first position, a second transverse bore in said second valve plug registering with said second entrance and exit conduits with said second valve plug in a first position to provide discharge of a single fluid through said diffuser to said discharge opening, and said antisplash housing directing fluid from said diffuser toward said first exit conduit inside said spout to wash clean the inside of said spout.

References Cited in the file of this patent

UNITED STATES PATENTS

| | | |
|---|---|---|
| 1,965,833 | Geddes | July 10, 1934 |
| 2,179,611 | Brown | Nov. 14, 1939 |
| 2,371,432 | Di Pietro | Mar. 13, 1945 |
| 2,733,731 | Turak | Feb. 7, 1956 |